Figures 1, 2:
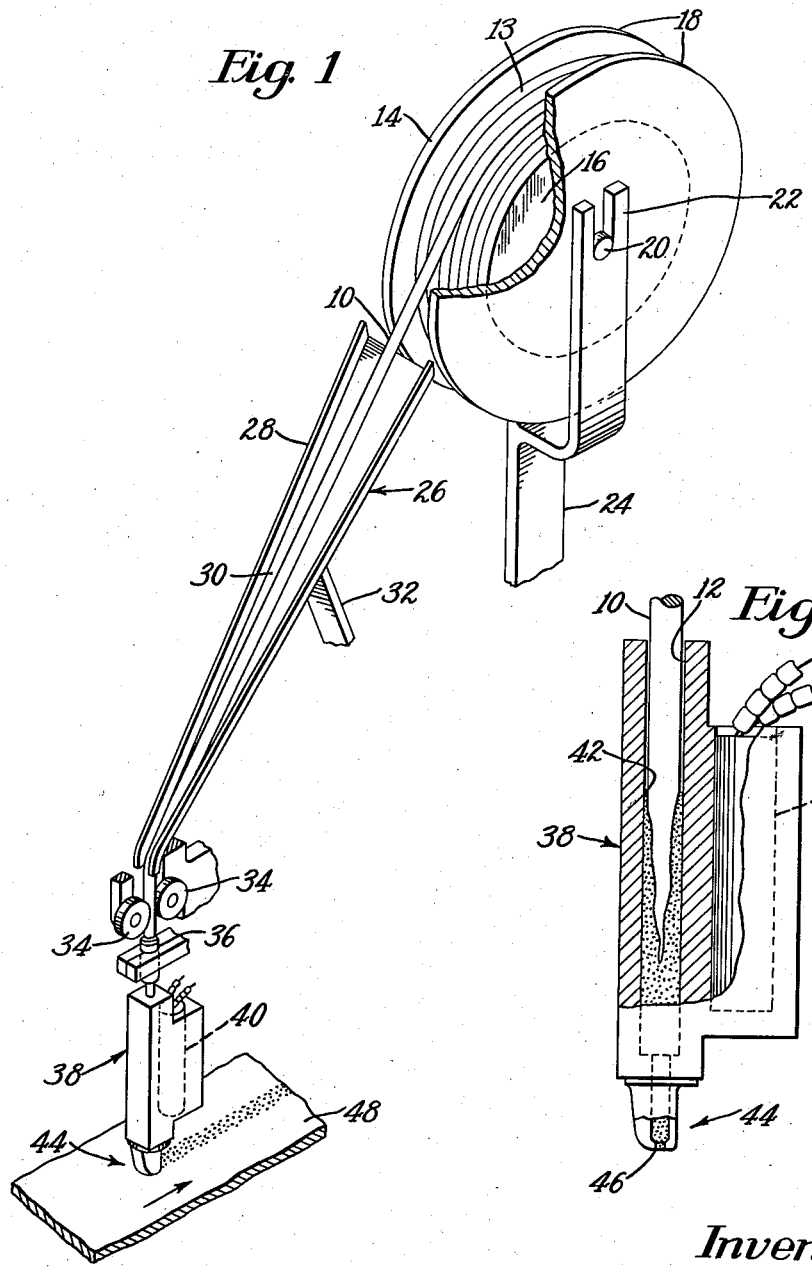

Inventors
Thomas C. Morris
Eric C. Johnson
By their Attorney

United States Patent Office 2,894,925
Patented July 14, 1959

2,894,925

POLYETHYLENE CONTAINING ADHESIVE

Thomas C. Morris, Lexington, and Eric C. Johnson, Somerville, Mass., assignors to B. B. Chemical Co., Boston, Mass., a corporation of Massachusetts Application June 24, 1954, Serial No. 439,122

7 Claims. (Cl. 260—27)

This invention relates to a new thermoplastic adhesive and particularly to a thermoplastic adhesive rod for direct through-feed application for forming joints between polyethylene or polyethylene coated sheet materials.

This application is a continuation-in-part of our copending application Serial No. 377,162, filed August 28, 1953.

Polyethylene plastic material possesses many desirable characteristics including inertness to most chemicals and solvents at ordinary temperatures, toughness and flexibility. Particularly in the form of relatively thin sheets polyethylene was found extensive use for containers or liners of containers, in coverings and in other allied uses.

Many of these uses require that a seam be formed between two polyethylene surfaces or between a polyethylene surface and another surface. The waxy paraffin-like character of polyethylene surfaces interferes with adhesion by most of the commonly employed adhesive or coating agents. It has been observed also that certain adhesives may form a bond which is of acceptable strength for a short period after completion but which, within a period of at most a few days, weakens to such an extent that the bonded surfaces may fall apart. Because of this difficulty with adhesive bonding, the formation of seams or joints between polyethylene surfaces has, in substantial measure, been performed by fusing the surfaces together under heat and pressure. Very careful control is necessary for this type of joining in order that the polyethylene may not be melted to such an extent as to squeeze out the polyethylene from between the sealing members, while at the same time adequate heat and pressure must be applied to form a continuous bond. Unlike vinyl resins, polyethylene surfaces cannot be joined electronically, that is, the dielectric characteristics of polyethylene are such that subjecting it to a high frequency electric field will not induce bonding heat internally. Because of the degree of control required, heat sealing of thin sheet polyethylene to itself or other surfaces tends to be restricted to relatively simple joining operations.

It is a feature of the present invention to provide a thermoplastic adhesive composition and an adhesive rod for use in a direct through-feed cementing system, the adhesive and adhesive rod being particularly useful in the operation of joining a polyethylene surface to another surface.

According to the present invention there is provided a new thermoplastic adhesive composed of a mixture in certain ranges of relative proportions of polyethylene with isobutylene polymeric material and a hydrocarbon resin having at elevated temperatures at least limited solvent power toward the polyethylene. For the bonding of polyethylene surfaces, the adhesive composition is applied in hot molten condition at a temperature well above the melting point of polyethylene to be bonded, and in quantity to carry sufficient heat to melt the surface portions only of the polyethylene to cause mutual solution of the adhesive and polyethylene surface portions. When the joint cools, the adhesive composition adheres firmly to polyethylene and other surfaces to form a strong, flexible joint. Adhesive rods composed of the special combination of polyethylene, isobutylene polymeric material and hydrocarbon resin possess to a high degree the properties of dimensional stability and resistance to cracking together with the ability to be softened progressively by heat to fluid activated condition in a direct through feed adhesive dispensing system.

The invention will be described further in connection with the accompanying drawings forming part of the disclosure in which, Fig. 1 is an angular view of the adhesive supply and control rod in coil form with a portion uncoiled and inserted into a passageway for softening and dispensing the adhesive; and Fig. 2 is a view with parts broken away of the adhesive rod disposed as a piston in a complementary passageway showing the cooperative relation between the body of solid adhesive and the walls of the passageway for controlling flow of adhesive through the passageway to the point of application.

As shown in Fig. 1 the thermoplastic adhesive rod 10 for direct through-feed adhesive dispensing is an elongated self-supporting body of solid, thermoplastic adhesive having a substantially uniform gross cross section complementary to the cross section of the entrance to the heated softening and dispensing pasageway 12. The solid self-supporting rod 10 is shown coiled in overlapping layers 13 on a spool 14 from which it is fed to the melting and dispensing passageway 12. The spool 14 comprises a relatively large diameter hub member 16 and side flanges 18 and is rotatably mounted on a supporting shaft 20 which is fitted in the slotted upper ends 22 of a bifurcated supporting bracket 24. The adhesive rod 10, after it is uncoiled from the spool, passes through a trough 26 having side walls 28 and a bottom wall 30 supported by a post 32 and into the bite of toothed or notched feed rolls 34 which firmly grip it for applying axial pressure to the rod 10. From the feed rolls 34 the rod 10 passes through a guide bushing 36 and into the entry end of the passageway 12 in the heating and applying member.

As shown in Fig. 2, the passageway 12 comprises a body portion 38 in one side of which is disposed a heating element 40 to supply heat through the body portion 38 to the passageway 12. The adhesive rod 10 effectively fills the entrance portion of the passageway 12, any slight gap between the rod 10 and the walls of the passageway 12 being sealed by softened or molten material 42. When moved forward the rod 10 bears uniformly against the full cross section of adhesive whether incompletely or wholly in fluid form in the forward portions of the passageway. The uniform bearing of the rod against the entire cross section of adhesive in the passageway insures orderly progress of adhesive through the passageway which constitutes an important advantage of direct through feed adhesive dispensing.

The effective seal between the solid rod and the walls of the passageway creates a relation between them such that the rod 10 moves into the passageway 12 at the same time that an equivalent volume of heat softened adhesive leaves the dispensing end 44 of the passageway 12 through opening 46 and is spread on a work piece 48 moving beneath it. When movement of the rod 10 is halted it aids in retaining softened adhesive within the passageway 12. Thus the rod 10 serves as a supply and/or control member in the direct through-feed adhesive dispensing system and gives particularly advantageous operational characteristics when the system is used in combination with automatic or semi-automatic machines. To function as such control it is important that the rod have an indefinite length and that the rod be capable of being uncoiled from the spool or reel 14 without cracking. It is necessary that the rod in the coil retain its cross section substantially unchanged on storage and that it not adhere to adjacent coils in order that the rod may be uncoiled from the spool in a cross sectional shape complementary to the cross sectional shape of the passageway 12.

The present adhesive rod or strip owes its effectiveness to the combination and proportioning of polyethylene, an isobutylene polymeric material and a hydrocarbon resin having, at elevated temperatures, limited solvent action on the polyethylene. These components are combined in proportions which give to the adhesive in molten condition a viscosity enabling it to be spread and to enter into intimate engagement with surfaces to be bonded, controlled solvency towards a polyethylene resin surface to provide an integrating action between the deposited body of adhesive and the polyethylene surface to be adhered, and a consistency of the materials at a joint which aids in holding them together prior to final setting up of the cement. The combination of components also provides a flexibility of bond after cooling and setting up of the adhesive which reduces localized shearing forces at the juncture between the adhesive and polyethylene surface and within the adhesive layer itself to provide a desirably strong linking action.

A preferred hydrocarbon resin is a polyterpene resin, and specifically a B-pinene polymer such as that sold under the trademark "Piccolite." This polymeric material is made in a wide range of melting points, the preferred polymers being those having a melting point of 85° to 125° C. This material exerts in molten form substantial solvent action on the polyethylene resin. Other hydrocarbon resins which possess substantial solvent action in molten condition include resinous polymerization products obtained by catalytic polymerization of mixed unsaturated monomers derived from cracked petroleum, and the resin separated from Utah type resin-bearing coal which consists essentially of carbon and hydrogen, has an average molecular weight of about 1,000, a refractive index of 1.544, a specific gravity of from 1.03 to 1.06 and a melting point of from 165° to 180° C.

The polyethylene component of the adhesive composition is a relatively high molecular weight of polyethylene, i.e., a resinous polyethylene as distinguished from a wax or grease. It is preferred to employ polyethylene materials having molecular weights in the range of from about 7,000 to about 21,000 as determined by viscometric means using a solution of the polyethylene in tetralin at 130° C. and calculating the molecular weight by the following equation:

$$M = \frac{K_{cm} \log_{10} \eta_r}{C}$$

where M equals weight average molecular weight, $\eta_r$ equals relative viscosity, C equals base molar concentration of polymer in tetralin at temperature of determination equals 4.0 gms. per liter at 130° C. and $K_{cm}$ equals $4.03 \times 10^4$ gms. per liter of solution at 130° C. In the composition it appears that the polyethylene is fluxed and dissolved by the hydrocarbon resin and that by its presence in the hydrocarbon resin it controls the solvent power of the resin towards further dissolving ability towards polyethylene. In the solidified adhesive it appears also to serve as a reinforcing filler to reduce cold flow.

The isobutylene polymeric material may be a high molecular weight rubbery polyisobutylene, i.e. a material having a molecular weight of the order of about 100,000 or may be the material known as butyl rubber, that is, a sulphur vulcanizable rubbery copolymer of isobutylene and a diolefin, usually isoprene or butadiene, in approximately the proportions of 98 parts isobutylene to two parts of the diolefin. The isobutylene polymeric material gives a flexibility and resistance to cracking to the composition which is important to a rod adhesive of this nature for direct through-feed adhesive dispensing. In addition the isobutylene polymeric material cooperates in molten condition with the hydrocarbon resin to insure a viscosity and smoothness in the molten composition which enables a uniform deposit of adhesive on surfaces to be joined and controls the melting characteristics of the adhesive to give to the rod the property of progressive softening by heat to fluid activated condition in direct through feed adhesive dispensing. In a layer of adhesive deposited to form a joint between surfaces it provides desirable viscosity to aid in holding the surfaces together prior to final setting up of the adhesive.

To achieve the desired combination of properties in the adhesive composition it has been found important to combine the foregoing materials in the proportion of from about 15% to 60% of polyethylene, preferably 40% to 55%, from 10% to 35%, preferably 20% to 30%, of the isobutylene polymeric material and from 20% to 60% of the hydrocarbon resin possessing in molten condition solvent action toward the polyethylene. It is possible to use mixtures of more than one hydrocarbon resin possessing the desired solvent characteristics and to use more than one type or molecular weight of the isobutylene polymeric material. It is important, however, in combining these materials to select components of sufficiently high molecular weight and melting point that the adhesive composition is substantially dry, that is, substantially tack free and dimensionally stable at ordinary room temperature.

Other materials may be added including antioxidants or substances which impart special properties such as very fine mineral fillers including calcium silicate, carbon blacks, and the like. Heat advancing phenolic resins or rosin-maleic anhydride adducts may be incorporated in limited amounts, e.g. up to 25%, to give improved metal adhesion. Vulcanized oil, that is, factice, may also be incorporated in limited amounts up to 10%, to increase tack.

The hydrocarbon resin, isobutylene polymeric material, polyethylene and other components are mixed and melted together with positive agitation, for example in a Reed mixer. A convenient procedure involves melting the hydrocarbon resin in the mixer, adding the isobuylene polymeric material and agitating until smooth and thereafter adding the polyethylene and other materials and continuing the agitation until the composition is smooth. At this point the molten material may be extruded directly as a rod or cooled and optionally sheeted out for subsequent use as a hot melt adhesive or extrusion as a rod adhesive.

The present rod adhesive is dimensionally stable, possesses flexibility for coiling and uncoiling and is sufficiently firm for feeding in a direct through feed dispensing and applying system. In the heating passageway of such a system the rod is progressively softened by heat to insure orderly controlled progress of adhesive through the passageway and is brought to fluid activated condition at the rate at which adhesive is consumed in the system.

The bonding of polyethylene surfaces involves the melting of surface portions of the polyethylene by the heat carried by the adhesive composition in order that mutual solution of the adhesive and the surface portions of the polyethylene may take place. The quantity of heat carried is a function of the weight quantity of adhesive deposited on a given area and the temperature of the adhesive deposited so that heat to melt the polyethylene may be obtained by employing a large quantity of adhesive at a relatively low temperature or by depositing a small quantity of adhesive at a relatively high temperature or intermediate quantities of adhesive at intermediate temperatures. The closeness of control of both temperature and quantity of adhesive deposited in a direct through feed dispensing and applying system using the rod adhesive of the present invention enables particularly effective bonding. Through simple adjustment of quantity and temperature of adhesive in the operation of this system it has been found that the quantity of heat supplied as molten adhesive may be closely controlled to give softening of the surface portions of the polyethylene and mixing of the adhesive and polyethylene to create a strong flexible bond presenting a uniform gradation in properties from the pure polyethylene of the surface to be bonded to the pure cement of the adhesive layer.

The following examples are given to aid in understanding the invention but it is to be understood that the invention is not restricted to the specific compositions or conditions of application or specific properties of the compositions given in the examples:

Example I

| | Parts by weight |
|---|---|
| Polyethylene (DYLT) mol. wt. 18,000 | 50 |
| B-pinene polymer Resin—melting point 115° C. (Piccolite S-115) | 30 |
| Copolymer of about 98 parts isobutylene and 2 parts isoprene (GRI-17) | 20 |
| Antioxidant | 2 |

The B-pinene polymer resin was introduced into a Reed mixer and melted by bringing its temperature to 150° C. The copolymer material was then added and mixed in and the temperature was lowered to about 125° to 130° C. When the mixture was smooth, the temperature was again raised to 150° C. and the polyethylene and antioxidant were added and mixed until the composition was smooth. The mixture was extruded as a ¼" rod, the extrusion temperature being maintained between 200° and 250° F.

This rod adhesive was coiled on a reel of which the core had a minimum diameter of only 2" and was readily uncoiled for use with the dispensing apparatus. The rod possessed a stiffness and hardness such that it could readily be pushed into the dispensing apparatus and was found to be effective for the bonding of polyethylene sheet material or polyethylene coated sheet material, the temperature of application being approximately 325° F. The material was useful also for bonding leather in certain shoe cementing operations where the speed of set was not critical.

The rod was capable of storage on the reel for a period greater than 6 months without observable change in cross section. The brittle temperature was below 17° F. At a temperature of 325° F. the molten adhesive had a viscosity of approximately 250,000 centipoises as measured in a Brookfield viscosimeter.

Example II

| | Parts by weight |
|---|---|
| Polyethylene (DYJT) mol. wt. 10,000 | 50 |
| B-pinene polymer Resin—melting point 115° C. (Piccolite S-115) | 25 |
| Copolymer of about 98 parts isobutylene and 2 parts isoprene (GRI-17) | 25 |
| Antioxidant | 2 |

This adhesive was mixed and extruded as a ¼" rod by the procedure outlined in connection with Example I and was useful for the same purposes as the cement of Example I. This adhesive had a brittle temperature of 40° F.

Example III

| | Parts by weight |
|---|---|
| The resin separated from Utah resin-bearing coal (RBH-510) consisting essentially of carbon and hydrogen, having an average molecular weight of 1,000, a refractive index of 1.544, and a melting point of 165°–180° C. (described more fully in U.S. Patent 2,461,552 to Radi, Feb. 15, 1949) | 47.4 |
| Piccolyte S40, a polymer of B-pinene having a 40° C. melting point | 5.2 |
| Hard brittle polymerized rosin having a melting point of 208–217° F., flash point 424° F., acid number 150, and specific gravity 1.072 | 10.6 |
| Triethylene glycol di-2-ethyl butyrate (3GH) | 6.8 |
| Copolymer of 98 parts of isobutylene and 2 parts of isoprene (GRI-50) | 15 |
| Polyethylene (DYLT) mol. wt. 18,000 | 15 |
| Antioxidant | 2 |

The resin from Utah resin-bearing coal, the B-pinene polymer resin and the polymerized rosin were fluxed in a W.P. mixer at 250° F. The mixture was then cooled to 200° F. and the triethylene glycol di-2-ethyl butyrate was added and thoroughly mixed. Thereafter the copolymer of isobutylene and isoprene, the polyethylene and the antioxidant were added and combined as in the procedure set forth in Example I. This material was extruded as a ¼" rod at an extrusion temperature of 200° F. The rod so obtained had a brittle point of 34° F. and was useful for the same purposes as the rod adhesive of Example I but showed a much faster speed of set. The adhesive had a desirably low viscosity in molten condition which is believed to be due to the gel structure-breaking effect of the resin from Utah resin-bearing coal on the isobutylene-isoprene copolymer gel.

Example IV

| | Parts by weight |
|---|---|
| Polyethylene (DYLT) mol. wt. 18,000 | 45 |
| Petroleum base resin (Piccopale 100) | 15 |
| B-pinene polymer resin melting point 115° C. (Piccolyte S-115) | 15 |
| Polyisobutylene mol. wt. 120,000 | 25 |
| Antioxidant | 2 |

The Piccopale 100 is a resinous polymerization product obtained by catalytic polymerization of a mixture of unsaturated monomers derived from deep cracking petroleum. The monomers have a molecular weight approximating 90 and are composed essentially of dienes and reactive olefines. The resin has a softening point (Ball and Ring) of approximately 100° C., a specific gravity at 25° C., of .970 to .975, a refractive index at 20° C. of 1.5116, an acid number less than one, an iodine value (Wijs) of 120, a bromine number of 7.3 and a molecular weight of approximately 1100.

The petroleum base resin and the B-pinene polymer were fluxed in a Reed mixer at a temperature of 130° to 140° C. The polyisobutylene was then added and the temperature of the mixer lowered to a point where the mixer pulled hard. Mixing was continued until a smooth blend was obtained. Thereafter the temperature was raised to about 140 to 150° C. and the polyethylene and antioxidant were added and mixed until the composition was smooth. The mixture was extruded as a ¼" rod.

The rod was found effective in a direct through-feed dispensing and applying device for the bonding of polyethylene sheet material or polyethylene coated sheet material.

Example V

| | Parts by weight |
|---|---|
| Polyethylene (DYLT) mol. wt. 18,000 | 48.6 |
| Copolymer of about 98 parts isobutylene and 2 parts isoprene (GRI-17) | 19.4 |
| Petroleum base resin (Piccopale 100) | 29.1 |
| Antioxidant | 2.9 |

The Piccopale 100 was melted in a Reed mixer and the copolymer of butylene and isoprene was added and mixed in until the composition was smooth. Thereafter the polyethylene and the antioxidant were added and mixed in until the composition was smooth. The material was extruded as a ¼" fluted rod which had a brittle point of below 33° F.

This rod was fed to a direct through-feed adhesive dispensing and applying apparatus maintained at a temperature of 375° F. and was applied by the machine directly on a 2-mil polyethylene sheeting as a layer .002" thick, a second layer of the polyethylene sheeting being at once deposited on the adhesive layer and lightly rolled into engagement. The polyethylene sheeting employed had a molecular weight of about 19,000 and a melting point of about 230° F. The polyethylene was joined together by this procedure at a rate which could be as high as several hundred feet per minute. A strong bond was obtained with no distortion of the polyethylene sheets joined. In the bond between the sheets, the adjacent surface portions of the polyethylene sheets were dissolved and integrated with the cement so that the joined surfaces could not be separated without destruction of the sheeting.

In contrast to the above, it was found that employing the same polyethylene sheeting and adhesive rod but using a temperature of 300° F., the adhesive was deposited smoothly between the polyethylene sheets, but no effective bond was obtained.

Having thus described our invention, what we claim as new and desire to secure by Letters Patent of the United States is:

1. A solvent-free thermoplastic adhesive cement comprising thermoplastic components melted together and cooled to form a dry, substantially tack-free body, solid at normal temperatures but softenable by heat to fluid activated condition, said thermoplastic components being composed of a mixture of from 15% to 60% by weight of resinous polyethylene having a molecular weight of from about 7,000 to about 21,000, from 10% to 35% by weight of high molecular weight isobutylene polymeric material from the group consisting of sulphur vulcanizable rubbery copolymers of isobutylene and a diolefin in approximately the proportions of 98:2 and rubbery polyisobutylene having a molecular weight of the order of 100,000 and from 20% to 60% by weight of an essentially hydrocarbon resin having a softening point of at least about 85° C. possessing in heated condition at least limited solvent power toward said polyethylene, said resin being selected from the group consisting of polyterpene resins having a softening point of 85° C. to 125° C., the resin separated from Utah resin-bearing coal and the resinous polymerization product obtained by catalytic polymerization of a mixture of unsaturated monomers derived from deep cracking petroleum and having a softening point (B.R.) of approximately 100° C., a specific gravity at 25° C. of .970 to .975, a refractive index at 20° C. of 1.5116, an acid number less than one, an iodine value (Wijs) of 120, a bromide number of 7.3 and a molecular weight of approximately 1100.

2. As a new article of manufacture, a rod composed of a thermo-plastic adhesive cement, said rod being formed by melting together and extruding the components of said adhesive cement and being dry, substantially tack-free, and solid at normal temperatures but being progressively softenable by heat to fluid activated condition as it is consumed in a direct through-feed adhesive dispensing and applying system, said adhesive comprising from 15% to 60% by weight of resinous polyethylene having a molecular weight of from about 7,000 to about 21,000, from 10% to 35% by weight of high molecular weight isobutylene polymeric material from the group consisting of sulphur vulcanizable rubbery copolymers of isobutylene and a diolefin in approximately the proportions of 98:2 and rubbery polyisobutylene having a molecular weight of the order of 100,000 and from 20% to 60% by weight of an essentially hydrocarbon resin having a softening point of at least about 85° C. possessing in heated condition at least limited solvent power toward said polyethylene, said resin being selected from the group consisting of polyterpene resins having a softening point of 85° C. to 125° C., the resin separated from Utah resin-bearing coal and the resinous polymerization product obtained by catalytic polymerization of a mixture of unsaturated monomers derived from deep cracking petroleum and having a softening point (B.R.) of approximately 100° C., a specific gravity at 25° C. of .970 to .975, a refractive index at 20° C. of 1.5116, an acid number less than one, an iodine value (Wijs) of 120, a bromine number of 7.3 and a molecular weight of approximately 1100.

3. As a new article of manufacture, a slender, flexible, self-suporting rod composed of thermoplastic adhesive cement, said rod being formed by melting together and extruding the components of said adhesive cement and being dry, substantially tack-free and solid at normal temperatures but being progressively softenable by heat to fluid activated condition as it is consumed in a direct through-feed adhesive dispensing and applying system, said adhesive cement comprising from 15% to 60% by weight of resinous polyethylene having a molecular weight of from about 7,000 to about 21,000, from 10% to 35% by weight of a sulphur-vulcanizable rubbery copolymer of isobutylene and a diolefin in approximately the proportions of 98:2, and from 20% to 60% by weight of a polyterpene resin having a softening point of from about 85° C. to about 125° C.

4. As a new article of manufacture, a slender, flexible, self-supporting rod composed of thermoplastic adhesive cement, said rod being formed by melting together and extruding the components of said adhesive cement and being dry, substantially tack-free and solid at normal temperatures but being progressively softenable by heat to fluid activated condition as it is consumed in a direct through-feed adhesive dispensing and applying system, said adhesive cement comprising from 15% to 60% by weight of resinous polyethylene having a molecular weight of from about 7,000 to about 21,000, from 10% to 35% by weight of a sulphur-vulcanizable rubbery copolymer of isobutylene and a diolefin in approximately the proportions of 98:2, and from 20% to 60% of the resin separated from Utah resin-bearing coal.

5. As a new article of manufacture, a slender, flexible, self-supporting rod composed, of thermoplastic adhesive cement comprising from 15 to 60% by weight of resinous polyethylene having a molecular weight of from about 7,000 to about 21,000, from 10% to 35% of rubbery polyisobutylene having a molecular weight of the order of 100,000 and from 20% to 60% by weight of a polyterpene resin having a softening point of from about 85° C. to about 125° C. possessing in heated condition at least limited solvent power toward said polyethylene, said rod being formed by melting together and extruding the components of said adhesive cement and being dry, substantially tack-free and solid at normal temperatures but progressively softenable by heat to fluid activated condition as it is consumed in a direct through-feed adhesive dispensing and applying system.

6. As a new article of manufacture, a slender, flexible, self-supporting rod composed of thermoplastic adhesive cement, said rod being formed by melting together and extruding the components of said adhesive cement and being dry, substantially tack-free and solid at normal temperatures but being progressively softenable by heat to fluid activated condition as it is consumed in a direct through-feed adhesive dispensing and applying system, said adhesive cement comprising from 15% to 60% by weight of resinous polyethylene having a molecular weight of from about 7,000 to about 21,000, from 10% to 35% by weight of a rubbery polyisobutylene having a molecular weight of the order of 100,000, and from 20% to 60% by weight of the resinous polymerization product obtained by catalytic polymerization of a mixture of unsaturated monomers derived from deep cracking petroleum, said resinous polymerization product having a softening point (B.R.) of approximately 100° C., a specific gravity at 25° C. of .970 to .975, a refractive index at 20° C. of 1.5116, an acid number less than one, an iodine value (Wijs) of 120, a bromine number of 7.3 and a molecular weight of approximately 1100.

7. As a new article of manufacture, a slender, flexible, self-supporting rod composed of thermoplastic adhesive cement, said rod being formed by melting together and extruding the components of said adhesive cement and being dry, substantially tack-free and solid at normal temperatures but being progressively softenable by heat to fluid activated condition as it is consumed in a direct through-feed adhesive dispensing and applying system, said adhesive comprising from 15% to 60% by weight of resinous polyethylene having a molecular weight of from about 7,000 to about 21,000, from 10% to 35% by weight of a sulphur-vulcanizable rubbery copolymer of isobutylene and a diolefin in approximately the proportions of 98:2, and from 20% to 60% of a resinous polymerization product obtained by catalytic polymerization of a mixture of unsaturated monomers derived from deep cracking petroleum, said resin having a softening point (B.R.) of approximately 100° C., a specific gravity at 25° C. of .970 to .975, a refractive index at 20° C. of 1.5116, an acid number less than one, an iodine value (Wijs) of 120, a bromine number of 7.3 and a molecular weight of approximately 1100.

References Cited in the file of this patent

UNITED STATES PATENTS

| | | |
|---|---|---|
| 1,923,456 | Price | Aug. 22, 1933 |
| 2,220,545 | Reinhard | Nov. 5, 1940 |
| 2,339,958 | Sparks | Jan. 25, 1944 |
| 2,369,471 | Latham | Feb. 13, 1945 |
| 2,385,612 | Coutlee | Sept. 25, 1945 |
| 2,494,689 | Canfield et al. | Jan. 17, 1950 |
| 2,557,574 | Shonberg | June 19, 1951 |
| 2,638,463 | Ney et al. | May 12, 1953 |
| 2,639,257 | Szegvari | May 19, 1953 |
| 2,646,879 | Carstensen | July 28, 1953 |
| 2,647,096 | Radi | July 28, 1953 |
| 2,656,297 | Davis et al. | Oct. 20, 1953 |
| 2,683,105 | Forbes et al. | July 6, 1954 |
| 2,711,996 | Hofrichter | June 28, 1955 |

OTHER REFERENCES

Lee: "Paint, Oil and Chem. Review," June 10, 1948, pages 8, 9 and 50–58. (Copy in Scientific Library.)